MAGNETIC AMPLIFIERS

Filed June 2, 1959 2 Sheets-Sheet 1

INVENTOR

ERNEST FRANKLIN

BY Larson and Taylor

ATTORNEYS

Oct. 16, 1962 E. FRANKLIN 3,059,174
MAGNETIC AMPLIFIERS
Filed June 2, 1959 2 Sheets-Sheet 2

United States Patent Office 3,059,174

Patented Oct. 16, 1962

3,059,174

MAGNETIC AMPLIFIERS

Ernest Franklin, Abingdon, England, assignor to United Kingdom Atomic Energy Authority, London, England Filed June 2, 1959, Ser. No. 817,586
Claims priority, application Great Britain June 4, 1958
9 Claims. (Cl. 323—89)

This invention relates to magnetic amplifiers of the pulse relaxation type.

A pulse relaxation magnetic amplifier is described by R. E. Morgan and J. B. McFerran in "Communications and Electronics" (New York), No. 13, pp. 245–9 (July 1954). Briefly the principle of operation of this amplifier is that each stage comprises a rectangular hysteresis loop core which is set to a position on the loop depending on the input signal. A power pulse is then applied to drive the core into saturation, this pulse having a voltage-time integral so large that only the first part of the pulse is required to do so. The core then presents a low impedance to the remainder of the pulse and a large current pulse whose width depends on the original core setting flows in the power pulse circuit. In the first stage of the amplifier the input signal is a D.C. current; in the subsequent stages (or interstages) it is the current pulse produced when the power pulse saturates the core of the preceding stage. Gain is achieved either by having more turns on each power pulse winding than on the series-connected input winding of the subsequent stage, or by making successive cores of larger volume, or both.

In the practical circuits described, an A.C. bias waveform is applied to each core as well as the signal and the power pulses, and each core has associated with it a similar auxiliary core whose function is to prevent transformer coupling of the bias and signal waveforms into the power pulse circuits. In the interstages each auxiliary core is also supplied with a wipe-out waveform.

In the circuits described, all the pulses and waveforms are derived from a single-phase A.C. supply by the use of saturable transformers. It has been found in practice, however, that difficulties arise using the waveform sequence described in the paper, partly because the waveforms themselves are difficult to produce and partly because of the conflicting impedance requirements of the bias, power pulse and wipe-out circuits.

It is an object of the present invention to provide an improved waveform sequence.

According to the present invention, in a pulse relaxation magnetic amplifier comprising an input stage and at least one interstage, each stage comprising a main core and an auxiliary core, there are provided means for deriving in two phases in quadrature a sinusoidal bias and combined bias/wipe-out waveform for the main core of the input stage and for the auxiliary core only of each interstage respectively, connections for supplying alternate stages from each phase, means for deriving power pulses for each stage at or slightly before the instant when the bias or bias/wipe-out waveform to that stage passes through zero, and means for momentarily reducing said bias/wipe-out waveform to zero during the application of a signal pulse to the stage.

The sinusoidal waveforms used in the present invention can be readily generated at high voltages, and thus permit the use of high impedance sources which reduce the shunting effect of the wipe-out circuits on the signal and power pulses.

To enable the nature of the present invention to be more readily understood, attention is directed, by way of example, to the accompanying drawings wherein.

Figures 1, 2, 3, 4:
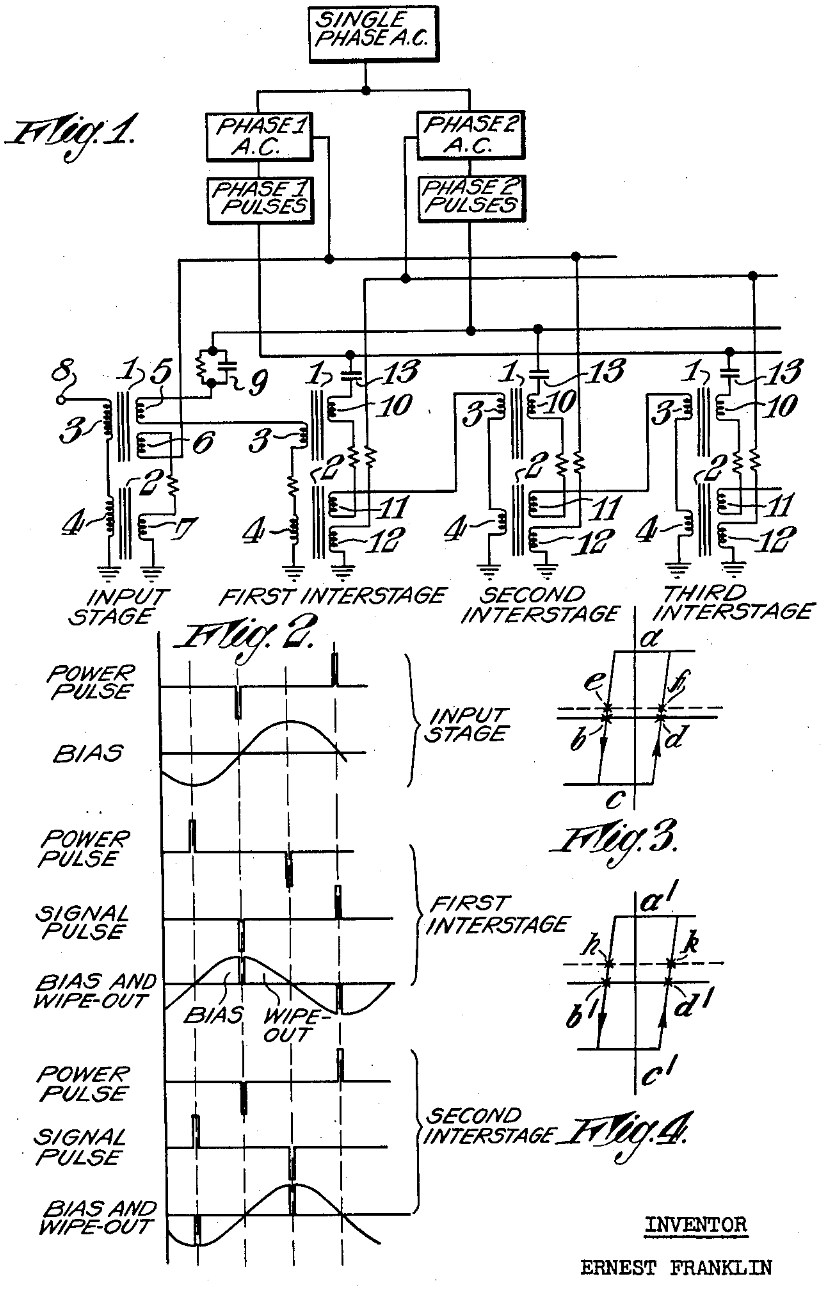
FIG. 1 is a semi-schematic circuit diagram of part of an amplifier according to the invention.
FIG. 2 shows waveforms in the circuit of FIG. 1.
FIGS. 3 and 4 represent the hysteresis loops of the magnetic cores used in the circuit of FIG. 1.

Referring firstly to FIG. 1, an input stage and three interstages are shown, each having a main core 1 and an auxiliary core 2. Each main core has an input winding 3 and each auxiliary core an input winding 4, connected in series.

Dealing now with the input stage only, the core 1 has a power pulse winding 5 and a bias winding 6, the latter being connected in series opposition with a bias winding 7 on core 2. Windings 3 and 4 are connected to a terminal 8 to which a D.C. input is applied. Windings 6 and 7 are fed with a sinusoidal bias waveform and winding 5 with a power pulse phased with respect to the bias waveform as shown in FIG. 2. The amplitude of the bias waveform is made sufficient to swing core 1 over half the range of the hysteresis loop, i.e. from point *a* to point *b* in FIG. 3. Initially it will be assumed for simplicity that the voltage-time integral of the power pulse is sufficient to swing the core over the entire range of the loop, i.e. from point *a* to point *c*.

In the absence of an input signal the core flux, starting from positive saturation (point *a*), is first changed to point *b* by the bias. Quarter of a cycle later the power pulse is applied, the first part of which takes the core to negative saturation (point *c*) and the remainder of which causes a large current pulse to flow in winding 5, since the impedance of the winding falls on saturation. The next bias half-cycle carries the core to point *d* and the next power pulse back to point *a*. The current pulses produced are the same width in both directions.

If now a positive D.C. signal is applied to winding 3, the effect is that the bias waveform leaves the core flux at say points *e* and *f* instead of points *b* and *d*. Thus more of the negative power pulse is required to carry the core to point *c* and less of the positive power pulse to carry the core to point *a* than in the absence of the signal. Hence the negative current pulse produced is narrower and the positive current pulse produced is wider. These current pulses provide the input to winding 3 of the first interstage.

The function of the core 2 is to prevent coupling between the bias circuit and the input circuit, the windings being connected in such a manner that the induced voltages cancel out. Also, to reduce coupling into the power pulse circuit, the latter includes a parallel resistance-capacity filter 9 which presents a high impedance to the slowly varying D.C. and bias waveforms, but a low impedance to the power pulse.

To obtain gain between the input stage and the first interstage, using main cores 1 of the same cross-sectional area in both stages, winding 3 of the first interstage is given fewer turns than winding 5 on the input stage. Assuming for simplicity a gain of two, the ratio of turns on the winding 5 to turns on the winding 3 will be 2:1. The numbers of turns on the two windings are adjusted so that the first two-thirds of the power pulse will swing core 1 of the input stage over half of its hysteresis loop, i.e. in the absence of an input signal from point *b* to point *c* in FIG. 3, the remaining third being sufficient, because of the turns ratio, to provide a current pulse to swing core 1 of the first interstage over half of its hysteresis loop also.

Assuming now that the D.C. input signal which set the input stage core to point *e* has increased by, say 10% the voltage-time integral required to saturate that core in the negative direction, i.e. 10% of the two-thirds of the power pulse required in the absence of a signal, the remaining third of the pulse available to set the interstage core is correspondingly reduced by 20%. Thus the negative power pulse sets the interstage core to point *h* in FIG. 4, where the displacement *h—b'* is twice *e—b*. Similarly, the positive power pulse has a 20% increase in the third available to set the interstage core and sets it to point *i* in FIG. 4.

The remaining interstages function similarly, the power pulses being applied to the windings 10 and the asymmetry of the negative and positive current pulses becoming progressively greater as the line *h—i* moves up the hysteresis loop from stage to stage.

In practice the stage gain is made greater than 2, for example about 10, the increased gain being obtainable not only by increasing the turns ratio but also by using cores of progressively greater volume in successive stages.

It will be noticed that, in the above-described arrangement having a turns ratio of 2 and equal-area cores, the total voltage-time integral of the power pulse would be insufficient to saturate the input stage core as soon as the line *h—k* had moved more than half-way up the hysteresis loop towards the point *a'* (FIG. 4); with an increased turns ratio the core would cease to saturate even sooner. However as the particular virtue of the pulse relaxation amplifier is its freedom from drift, it is normally used with small input signals only and this limitation is unimportant.

The core 2 in the interstages is provided to prevent coupling from the input circuit into the power pulse circuit. It is necessary, however, to provide on core 2 a bias and wipe-out winding 12 which is fed with the waveform shown in FIG. 2. Assuming both core 1 and core 2 to be initially at point *a'* in FIG. 4, the input pulse applied to windings 3 and 4 sends both cores to point *h* i.e. no net signal is induced in the power pulse circuit, but the wipe-out waveform returns core 2 to point *a'*. The power pulse carries core 1 to negative saturation (point *c'*) but has no effect on core 2 because winding 11 is wound in a direction to drive core 2 positive. Winding 11 thus presents a low impedance to the power pulse. After the power pulse the bias waveform takes core 2 to negative saturation ready for the next (positive) input pulse. It will be seen that the bias/wipe-out waveform is sinusoidal but has a portion chopped out at its peak value corresponding to the position of the input pulse.

One point that arises in the present mode of operation, and is referred to in the aforementioned paper, is that the filter condenser 13 in each interstage power pulse circuit tends to charge during the power pulse, and its discharge current following the pulse tends to reverse the saturation of the core. It has been found, however, that by making the condenser sufficiently large and the circuit resistance sufficiently high, the discharge current can be made less than the coercive current of the core and no disturbance to operation results.

Figure 5:
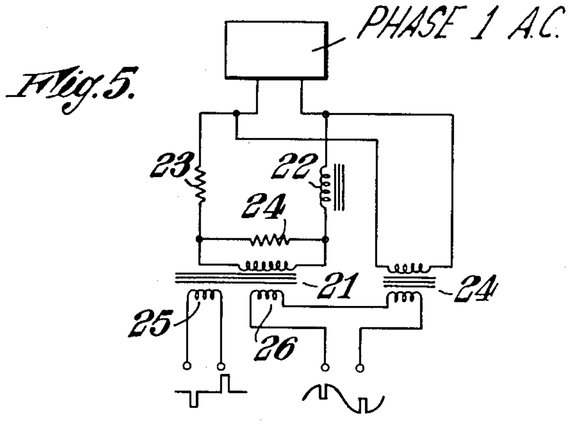
FIG. 5 is a circuit diagram of a circuit for generating the required waveforms.

As will be seen from FIGS. 1 and 2, alternate stages of the amplifier require sinusoidal bias/wipe-out waveforms of one phase, and the remaining stages sinusoidal bias/wipe-out waveforms of a second phase differing from the first by 90°. Such waveforms may be readily obtained from a single or three-phase supply by well known means, e.g. a Scott transformer. The power pulses are assigned phases in FIG. 1 corresponding to their production at the peak of the corresponding A.C. phase. These power pulses, and the "chopped out" bias/wipe-out waveform which is applied to the windings 12 of the interstages, may be produced using saturable cores in the manner described in the aforementioned paper and shown in FIG. 5.

In this circuit, the phase 1 power pulse and the chopping-out pulse for the bias/wipe-out waveform, are generated across the secondary windings 25 and 26 respectively of a saturable pulse transformer 21 whose primary winding is connected in series with a saturable inductor 22 and a resistor 23 across the phase 1 A.C. supply. In the manner explained in the aforementioned paper, inductor 22 holds off the first 89° or so of sine wave from the transformer 21, at which time it saturates and the supply voltage appears across the transformer 21 and resistor 23. The transformer saturates after about 2° of the sine wave, producing across windings 25 and 26 the required pulse waveforms as shown; the remaining portion of each half-cycle is dissipated in resistor 23. With a supply frequency of 50 c./s., 2° represents a pulse width of about 100 microsecs. A resistor 24 connected across the primary winding of transformer 21 constitutes a fixed load on the transformer and thus reduces variations in the width of the power pulse caused by changes in the effective load presented by the amplifier. The phase 1 A.C. supply is also applied to a non-saturable transformer 24, whose secondary winding is connected in series with secondary winding 26 to produce the bias/wipe-out waveform as shown. The circuit is duplicated to produce the phase 2 power pulse and bias/wipe-out waveforms.

It will be appreciated that the power pulses do not require to coincide precisely with the zero of the bias waveform of the other phase. They should not, however, occur any later, otherwise the power pulses in the input stage would tend to be neutralised by the bias waveform. Nor is it necessary that the bias waveform applied to core 1 of the input stage should swing it over exactly half of the hysteresis loop, so long as the core is biased to a linear region of the loop.

Figure 6:
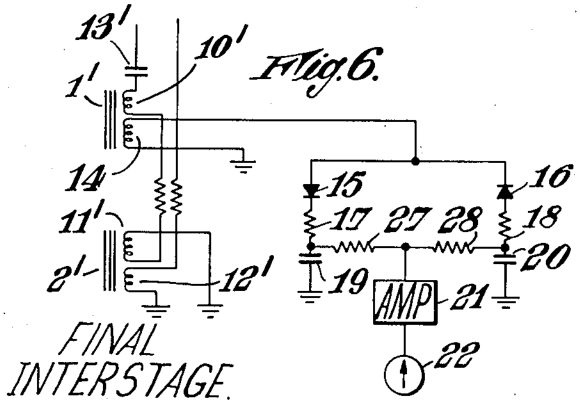
FIG. 6 is a circuit diagram of an output circuit for the amplifier.

The output from the final interstage can be further amplified by conventional magnetic means as described in the aforementioned paper, or an arrangement such as that shown in FIG. 6 can be used. In this circuit the main core 1' of the final interstage is provided with an output winding 14, one side of which is earthed; the side of winding 11' which in the preceding interstages was connected to winding 10 of the next interstage is also earthed. The other end of winding 14 is connected through rectifiers 15 and 16 respectively to two intergrating circuits comprising resistor 17 and condenser 19 and resistor 18 and condenser 20. Connected between condensers 19 and 20 are two equal-value resistors 27 and 28 whose junction is connected to an electronic D.C. amplifier 21, the output of which is shown on a meter 22.

The output from winding 14 consists of alternate negative and positive voltage pulses of constant amplitude, but the pulses of one polarity differ in width from those of the other polarity to a degree dependent upon the amplitude of the D.C. signal applied to the input stage. Whether the positive or the negative pulse is the wider depends on the polarity of the input signal. As rectifiers 15 and 16 are connected in directions to accept positive and negative pulses respectively, the mean voltages across condensers 19 and 20 are proportional to the widths of the positive and negative pulses. The difference between these voltages, as measured by the amplifier 21 and displayed on the meter 22, is therefore an indication of the amplitude and polarity of the input signal.

Alternatively the input winding of a conventional magnetic amplifier can be connected between the capacitors 19 and 20 instead of resistors 27 and 28.

I claim:

1. In a pulse relaxation magnetic amplifier comprising a plurality of stages connected in series in which the first is an input stage and the remainder is at least one interstage, each stage thereof including a main core and an auxiliary core, the provision of bias means for the input stage and bias/wipe-out means for each interstage comprising means for deriving sinusoidal waveforms in two phases in quadrature and connections for applying said waveforms from each phase to alternate stages of said series, the sinusoidal waveforms being applied to the main core and the auxiliary core of the input stage and to the auxiliary core only of each interstage, means for deriving power pulses for each stage not later than when the sinusoidal waveform applied to that stage passes through zero, and means for reducing the sinusoidal waveforms to zero substantially during the application of a power pulse to the preceding stage.

2. A pulse relaxation magnetic amplifier comprising a plurality of stages connected in series in which the first is an input stage, the next is a first interstage and the remainder are successively even-numbered and odd-numbered interstages, each stage thereof including a main core and an auxiliary core, the main core of the input stage having an input winding, a power-pulse winding and a bias winding, the auxiliary core of the input stage having an input winding and a bias winding, the main core of each interstage thereof having an input winding and a power-pulse winding and the auxiliary core of each interstage having an input winding, a power-pulse winding and a bias/wipe-out winding, the two input windings of the input stage being connected in series and the two bias windings of the input stage being connected in series in a sense to prevent coupling between the input and bias windings, the two input windings of each interstage being connected in series and the two power-pulse windings of each interstage being connected in series in a sense to prevent coupling between the input and power-pulse windings, means for deriving sinusoidal waveforms in two phases in quadrature, connections for feeding said waveform in one phase to the bias windings of the input stage and to the bias/wipe-out winding of each even-numbered interstage, connections for feeding said waveform in the other phase to the bias/wipe-out windings of each odd-numbered interstage, means for deriving a power pulse for each stage not later than when the sinusoidal waveform fed to that stage passes through zero, connections for feeding said power pulses to the power-pulse winding of the input stage and to power-pulse windings of each interstage, the input windings of the first interstage being connected in series with the power-pulse windings of the input stage and the power-pulse windings of each interstage being connected in series with the input windings of the succeeding interstage, and means for reducing the sinusoidal waveform fed to the interstage bias/wipe-out windings to zero substantially during the application of a power pulse to the preceding stage.

3. The invention of claim 1 in which said plurality is two.

4. The invention of claim 1 in which said plurality is three.

5. The invention of claim 1 in which said plurality is four.

6. The invention of claim 2 in which said plurality is three.

7. The invention of claim 2 in which said plurality is four.

8. The invention of claim 2 in which said plurality is five.

9. In a pulse relaxation magnetic amplifier comprising a plurality of stages including an input stage and at least one succeeding interstage, each stage thereof including a main core and an auxiliary core, bias means for the input stage and bias/wipe-out means for each interstage comprising series-connected bias windings on the main and auxiliary cores of the input stage and a bias/wipe-out winding on the auxiliary core of each interstage, means for producing a sinusoidal waveform in two phases in quadrature, connections for applying the sinusoidal waveform to the bias windings of the input stage and to the bias/wipe-out winding of each interstage, successive stages being connected to each phase alternately; power-pulse means for each stage comprising a power-pulse winding on the main core of the input stage and series-connected power-pulse windings on the main and auxiliary cores of each interstage, means for producing power pulses for each stage not later than when the sinusoidal waveform applied to that stage passes through zero, connections for applying said power pulses to the power-pulse winding of the input stage and to the power-pulse windings of each interstage; and means for reducing the sinusoidal waveform applied to each stage to zero during the application of each power pulse to the preceding stage.

References Cited in the file of this patent

UNITED STATES PATENTS

| | | |
|---|---|---|
| 2,710,952 | Steagall | June 14, 1955 |
| 2,834,006 | Kaufmann | May 6, 1958 |
| 2,897,293 | Morgan et al. | July 28, 1959 |